United States Patent
Matthews et al.

(10) Patent No.: US 10,391,951 B2
(45) Date of Patent: Aug. 27, 2019

(54) SUPPORT SYSTEMS FOR PORTABLE ELECTRONIC DEVICES

(71) Applicant: Safran Seats USA LLC, Gainesville, TX (US)

(72) Inventors: Wade G. Matthews, Argyle, TX (US); Eric L. Parks, Denton, TX (US); Andrew B. Severance, Fort Worth, TX (US); Jason K. Smith, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 100 days.

(21) Appl. No.: 15/517,694

(22) PCT Filed: Nov. 18, 2015

(86) PCT No.: PCT/US2015/061316
§ 371 (c)(1),
(2) Date: Apr. 7, 2017

(87) PCT Pub. No.: WO2016/081588
PCT Pub. Date: May 26, 2016

(65) Prior Publication Data
US 2017/0313258 A1    Nov. 2, 2017

Related U.S. Application Data

(60) Provisional application No. 62/081,060, filed on Nov. 18, 2014.

(51) Int. Cl.
| | | |
|---|---|---|
| *B60R 11/02* | (2006.01) | |
| *B60R 7/04* | (2006.01) | |
| *B60R 11/00* | (2006.01) | |

(52) U.S. Cl.
CPC ............... *B60R 11/02* (2013.01); *B60R 7/04* (2013.01); *B60R 2011/0017* (2013.01)

(58) Field of Classification Search
CPC .................................. B60R 11/02; B60R 7/04
(Continued)

(56) References Cited

U.S. PATENT DOCUMENTS

| | | | | | |
|---|---|---|---|---|---|
| 3,615,118 | A | * | 10/1971 | Buxton | .................. B60N 3/004 |
| | | | | | 297/188.07 |
| 6,994,401 | B1 | * | 2/2006 | Fischer | .................. A47C 7/725 |
| | | | | | 297/188.04 |

(Continued)

FOREIGN PATENT DOCUMENTS

| | | |
|---|---|---|
| EP | 2746157 | 6/2014 |
| JP | 2005205993 | 8/2005 |
| JP | 2010179740 | 8/2010 |

OTHER PUBLICATIONS

European Patent Application No. 15808301.4, Communication pursuant to 94(3) EPC; Examination Report, dated May 31, 2018.
(Continued)

*Primary Examiner* — Anthony D Barfield
(74) *Attorney, Agent, or Firm* — Kilpatrick Townsend & Stockton LLP; Dean W. Russell; Davidson G. Lucas

(57) ABSTRACT

Described are passenger seats that include a system for storing objects disposed on a rear side of the passenger seat. The system may include a cavity and a divider wall disposed within the cavity, wherein the divider wall separates a lower portion of the cavity into at least two compartments including a personal electronic device compartment on a rear side of the cavity and a secondary compartment on a forward side of the cavity.

20 Claims, 9 Drawing Sheets

(58) Field of Classification Search
USPC .................................. 297/188.04, 188.07
See application file for complete search history.

(56) References Cited

U.S. PATENT DOCUMENTS

2014/0042781 A1* 2/2014 Reeves .............. B60N 3/004
 297/188.07
2014/0175847 A1 6/2014 Schurg et al.

OTHER PUBLICATIONS

International Patent Application No. PCT/US2015/061316, Search Report and Written Opinion, dated Jan. 28, 2016.
European Patent Application No. 15808301.4, Communication pursuant to 94(3) EPC; Examination Report, dated Dec. 4, 2018.

* cited by examiner

SUPPORT SYSTEMS FOR PORTABLE ELECTRONIC DEVICES

CROSS REFERENCE TO RELATED APPLICATIONS

This patent application is the U.S. national stage of International Application No. PCT/US2015/061316 ("the '316 application"), filed on Nov. 18, 2015, which application is related to and claims priority benefits from U.S. Provisional Application Ser. No. 62/081,060 ("the '060 application"), filed on Nov. 18, 2014, entitled TABLET HOLDER WITH UPPER LITERATURE POCKET. The '316 and '060 applications are hereby incorporated in their entireties by this reference.

FIELD OF THE INVENTION

The invention relates to portable electronic device support assemblies for use with passenger seats or the like.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rests of the passenger seats.

With the advent of portable electronic devices ("PEDs"), such as tablet computers, mobile phones, smart phones, handheld video game systems, personal digital assistants, palmtop computers, DVD players, data and audio-video media, multi-media enabled devices, and other similar electronic devices, many passengers prefer to use their own PEDs, rather than the OBE or IFE components that are mounted in the passenger seats.

The rate at which PEDs, namely mobile phones, tablets, portable computers, personal digital assistants ("PDAs"), have been evolving has been exponential. These devices are constantly increasing in functions and decreasing/altering in size, making them more portable and at the same time able to perform more tasks. This evolution has led to passengers carrying their personal information and media on these devices with the expectation of using them while traveling.

To this point, there have been very few examples of the integration of these PEDs into airplane seats in any specific way to the seat, other than providing a location on a tray table, such as a groove to hold the PED, and sometimes a power connection to charge them. Because the mounting location is in the tray table, which must be stowed during certain times during flight, there is still a need for passengers to have a way to "hold" or "store" these PEDs while in flight in a manner that allows the PEDs to be used and enjoyed at any given moment. Furthermore, when the mounting location is a groove, the design inherently limits the thickness of the PEDs that may be secured in that location based on the thickness of the groove. Also, by using the tray table to support the PED, it is not positioned at eye level, which generates discomfort after prolonged periods of time.

Other solutions to date involve attaching case (either provided by airlines or customer-purchased) to the backs of passenger seats as an add-on device. A drawback to this solution is that most cases are not adaptable to a large range of differing sizes and shapes of PEDs (e.g., a case for a mobile phone often is not sized to accommodate a tablet or surface computer). For example, the cases offered by one airline can only hold iPads®, so other types of tablets or cellphones are not supported. An example of an improvement on conventional cases is shown in U.S. Publication No. 2011/0278885, wherein a cradle formed of multiple adjustable arms to support PEDs of varying sizes and shapes is configured to mount to a port within a passenger seat, and the connection between the cradle and the port also a power connection, and/or a communications connection to the OBE or IFE system and/or the internet to the PED.

When such cases are provided by the passengers, the passenger is able to ensure that the case will fit his or her device, but cannot be sure that the case will fit all types of passenger seats. As a result, the passenger may be forced to purchase an item that he or she may not be able to use on any other occasion. When provided by the airline, this solution creates the additional problem of having to carry on the plane a large amount of cases to provide for passengers, while also having to ensure that passengers will not take the holders with them after the flight.

In some cases, it may be desirable to provide a way for passengers to connect their PEDs to the OBE or IFE systems, so that they may use their own PEDs in lieu of the OBE or IFE systems. In other cases, it may be desirable to provide a way for passengers to connect their PEDs to the OBE or IFE systems to use in conjunction with the system's video display or to receive power for their PEDs or otherwise.

As a result, there is still a need for a support for PEDs that is always available and adaptable to a wide range of PED sizes, shapes, and thicknesses, and that does not create the need for an extra case or coupling assembly. Such a solution eliminates the need for airlines to provide a large number of cases, which represents additional weight and the need for additional storage space, as well as eliminating the costs for passengers to purchase an additional case for his or her PED. Such a solution also allows passengers to use their PEDs with or without a case, and to make the tray tables available for meals, documents, or any other object, or to allow passengers to stow the tray tables while still having the PEDs securely placed for use and/or viewing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a system for storing objects on a rear side of a passenger seat comprises: a cavity; and a divider wall disposed within the cavity, wherein the divider wall separates a lower portion of the cavity into at least two compartments including a personal electronic device compartment on a rear side of the cavity and a secondary compartment on a forward side of the cavity.

In some embodiments, the secondary compartment includes a lower extremity that extends below a lower extremity of the personal electronic device compartment.

The system, in certain embodiments, may further comprise an upwardly extending lip forming a lower boundary of the cavity, wherein the personal electronic device compartment comprises: at least one first retaining portion disposed on a forward side of the upwardly extending lip; and at least one second retaining portion disposed on a rear side of the divider wall.

In certain embodiments, the system further comprises an upwardly extending lip forming a lower boundary of the cavity, wherein the personal electronic device compartment comprises: at least one first retaining portion disposed on a forward side of the upwardly extending lip; and at least one second retaining portion disposed on a rear side of the divider wall.

In some embodiments, the first and second retaining portions are configured to deflect when an object is inserted between the at least one first retaining portion and the at least one second retaining portion.

In certain embodiments, the at least one second retaining portion is longer in a vertical direction than the at least one first retaining portion.

The system, in certain embodiments, may further comprise an access hole on a rear side of the system such that the access hole allows access to the secondary compartment. In some embodiments, the access hole is disposed adjacent to a lower internal surface of the secondary compartment and extends across an entire width of the secondary compartment.

According to certain embodiments of the present invention, a passenger seat may comprise: a system for storing objects disposed on a rear side of the passenger seat, the system comprising: a cavity; and a divider wall disposed within the cavity, wherein the divider wall separates a lower portion of the cavity into at least two compartments including a personal electronic device compartment on a rear side of the cavity and a secondary compartment on a forward side of the cavity.

The passenger seat, in certain embodiments, may further comprise a moveable tray table disposed on a rear side of the passenger seat and below the system for storing objects, wherein the moveable tray table is configured to move between a stowed position and a deployed position.

In certain embodiments, the passenger seat comprises an access hole that allows access to the secondary compartment. In some embodiments, the access hole is covered by the moveable tray table when in the stowed position and is accessible when the moveable tray table is in the deployed position. In certain embodiments, the access hole is disposed adjacent to a lower internal surface of the secondary compartment and extends across an entire width of the secondary compartment.

The passenger seat, in certain embodiments, may comprise an electronic connection disposed on a rear side of the passenger seat and adjacent to the system for storing objects. In some embodiments, the electronic connection is disposed on a first side of the system for storing objects and closer to a lower edge of the system for storing objects.

In some embodiments, the secondary compartment includes a lower extremity that extends below a lower extremity of the personal electronic device compartment.

The passenger seat, in certain embodiments, may comprise an upwardly extending lip forming a lower boundary of the cavity, wherein the personal electronic device compartment comprises: at least one first retaining portion disposed on a forward side of the upwardly extending lip; and at least one second retaining portion disposed on a rear side of the divider wall. In some embodiments, the first and second retaining portions are configured to deflect when an object is inserted between the at least one first retaining portion and the at least one second retaining portion. In certain embodiments, the at least one second retaining portion is longer in a vertical direction than the at least one first retaining portion.

In certain embodiments, the passenger seat further comprises a pivoting tab attached to a rear side of the divider wall.

In some embodiments, the pivoting tab is configured to move between a stowed position and a deployed position; and when the pivoting tab is in the stowed position, the pivoting tab fits in a notch formed in the divider wall and forms a continuous surface with the divider wall.

DETAILED DESCRIPTION

Figure 1:
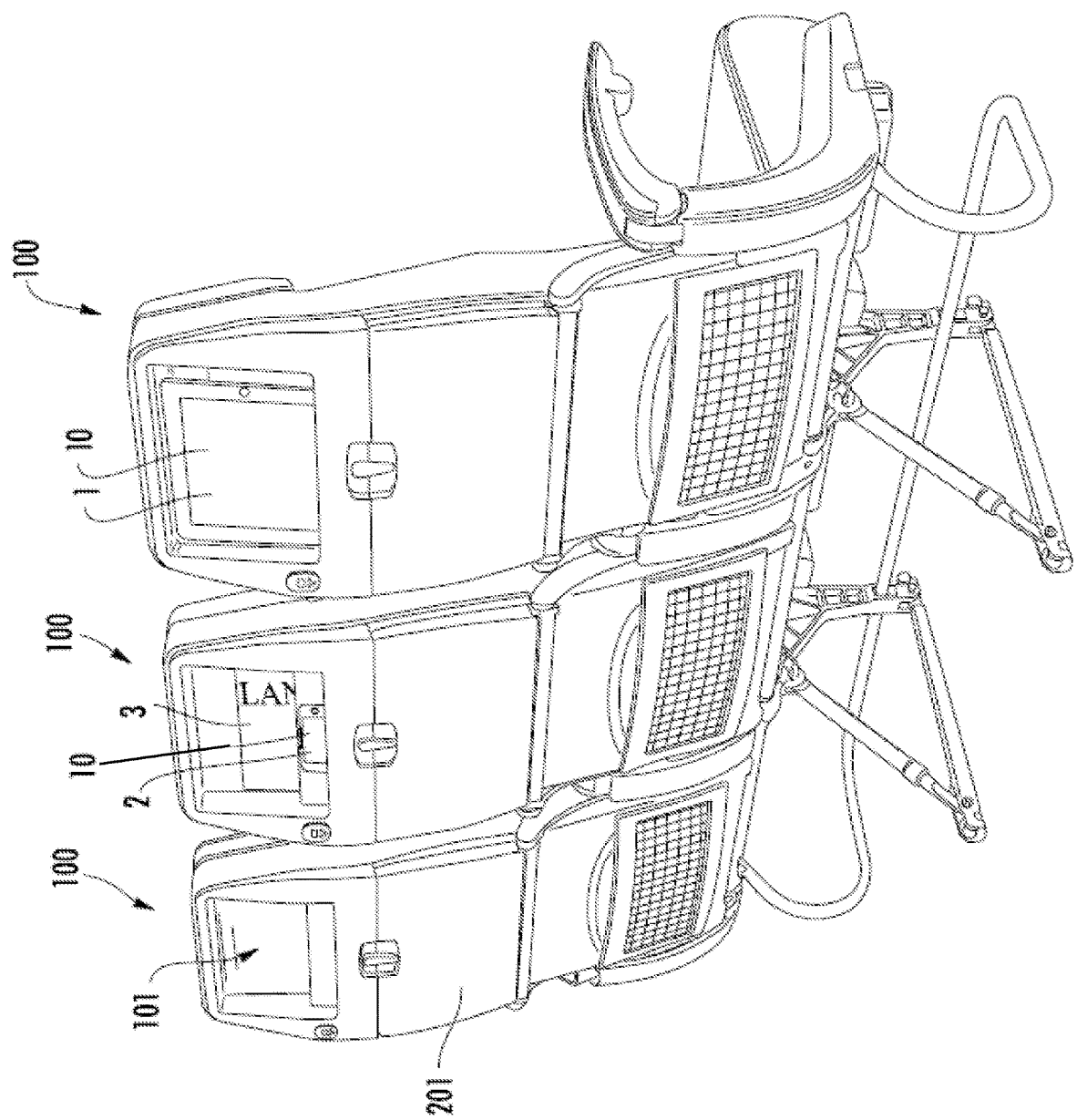
FIG. 1 is a perspective view of a support assembly mounted to a passenger seat, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide adjustable support assemblies for PEDs for use with passenger seats. While the adjustable support assemblies are discussed for use with aircraft seats, they are by no means so limited. Rather, embodiments of the adjustable support assemblies may be used in passenger seats or other seats of any type or otherwise as desired.

FIGS. 1-8 illustrate embodiments of passenger seats systems 100 for storing objects such as personal devices and/or PEDs 10. In these embodiments, the systems 100 may be configured to secure periodicals, PEDs, and/or other devices. The systems 100, in some embodiments, are substituted for monitors in the back of a seat.

In certain embodiments, as shown in FIGS. 1-5, the system 100 is disposed in a rear side of a passenger seat and includes a cavity 101 and a divider wall 102. In some embodiments, such as those shown in FIGS. 6A-6C, the system may comprise a cavity 601, a ledge 605, and one or more moveable retention tabs (602, 603). In some embodiments, such as those shown in FIG. 7, the system may comprise a cavity 701 and one or more pairs of retaining members (702, 703, 704, 705). In the embodiments shown in FIG. 8, the system may include a cavity 801, a divider wall 802, and a pivoting tab 803.

Figure 2:
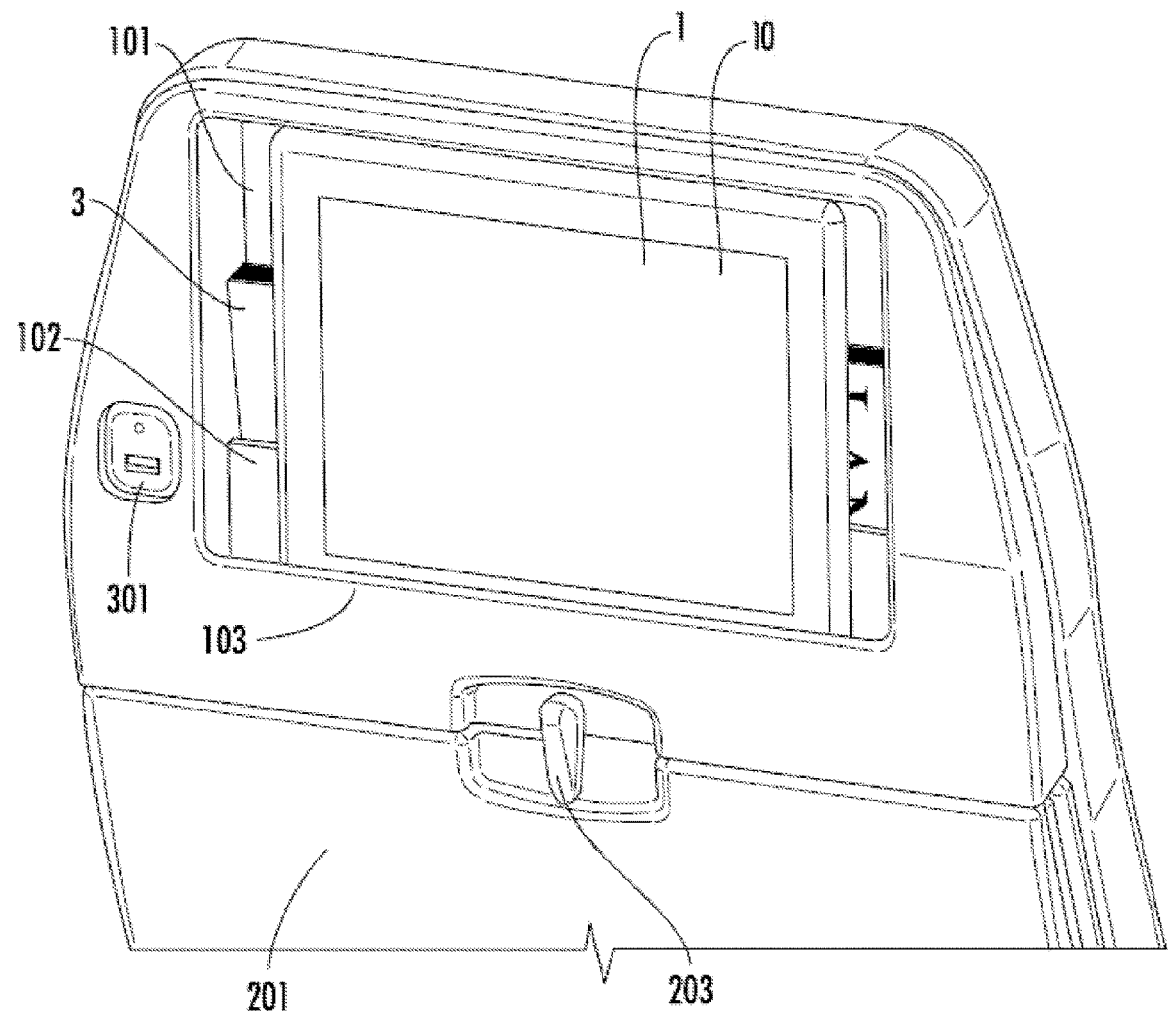
FIG. 2 is a detail perspective view of the support assembly and passenger seat of FIG. 1.
Figure 3:
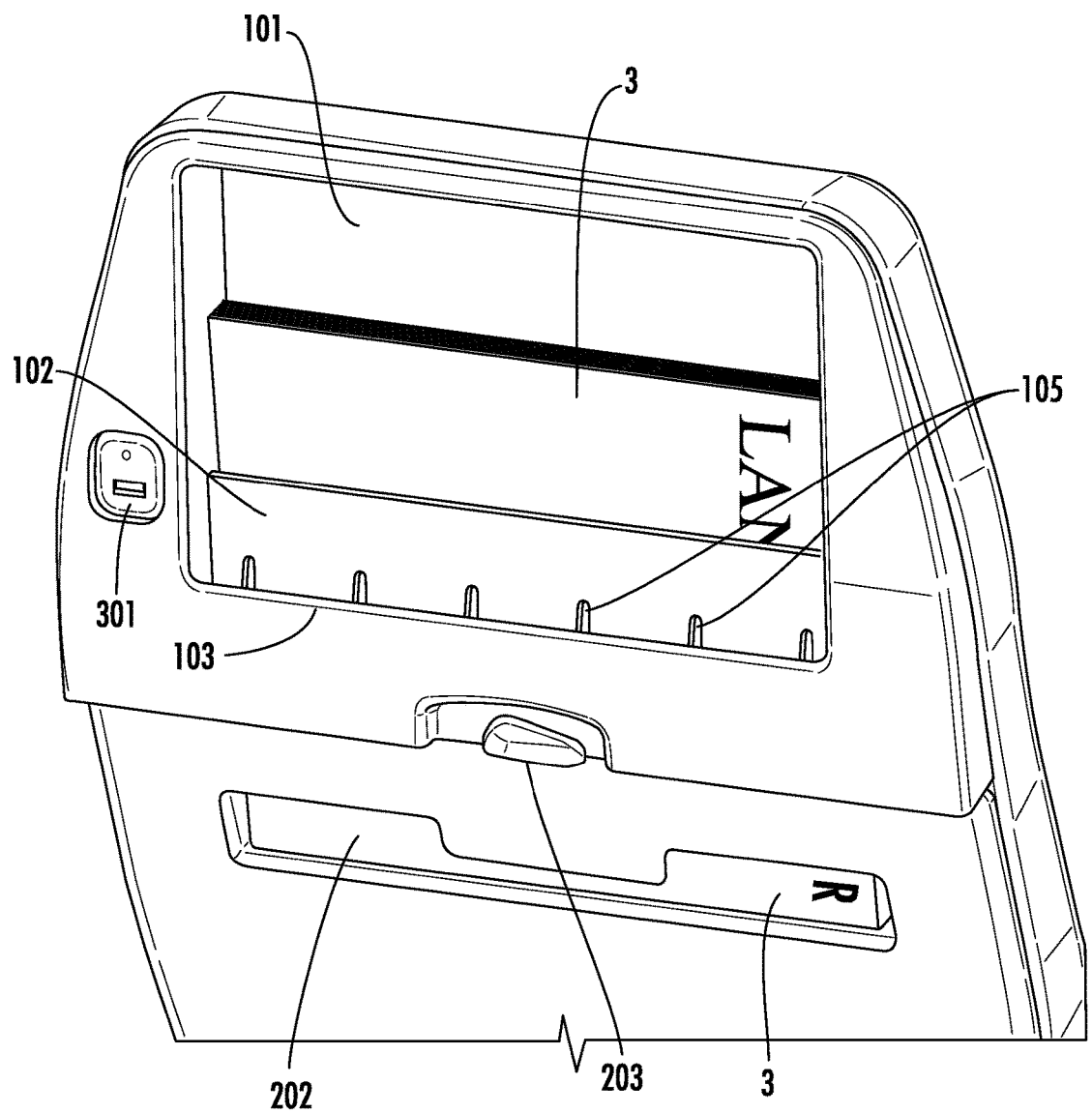
FIG. 3 is a detail perspective view of the support assembly and passenger seat of FIG. 1.

As best illustrated in FIGS. 1-3, the system may be capable of holding multiple objects such as a tablet 1, a mobile phone 2, and/or one or more periodicals 3. FIG. 1 shows an example where the system holds both a mobile phone 2 and at least one periodical 3 (see middle seat). FIG. 2 shows an example where the system holds both a tablet 1 and at least one periodical 3. Although the illustrations show tablets and mobile phones as examples of PEDs 10, numerous other types of devices may be substituted including, for example, handheld video game systems, personal digital assistants, palmtop computers, DVD players, data and audio-video media, multi-media enabled devices, and other similar electronic devices.

FIG. 3 shows a view of the system with the tray table 201 moved/folded down (after the latch mechanism 203 releases the upper edge of the tray table 201) to a deployed position (not shown) while the stowed position of the tray table 201 is shown in FIGS. 1 and 2. As shown in FIG. 3, the system may include a lower access hole 202 on a rear side of the system that allows access to a lower portion of the cavity 101. The lower access hole 202 is covered by the tray table 201 (while in the stowed position) but can be accessed when the tray table 201 is moved to the deployed position. In some embodiments, the system may include an electronic connection 301 (see FIGS. 2 and 3) where the electronic connection 301 may allow the PED 10 to send/receive data, multimedia, charging, and/or any other relevant electronic interface. For example, the PED 10 may be able to receive an internet signal through electronic connection 301, may be able to receive distributed music/video from the aircraft, or any other relevant electronic signal (including charging the PED 10). The electronic connection 301 may include one or more of USB, micro USB, 3.5 mm connector, DisplayPort, HDMI, mini-HDMI, Micro-HDMI, MHL, or any other appropriate connection. As shown in FIGS. 2 and 3, in some embodiments, the electronic connection 301 may be disposed adjacent the cavity 101. The electronic connection 301 may be closer to a lower edge of the cavity 101.

Figure 4:
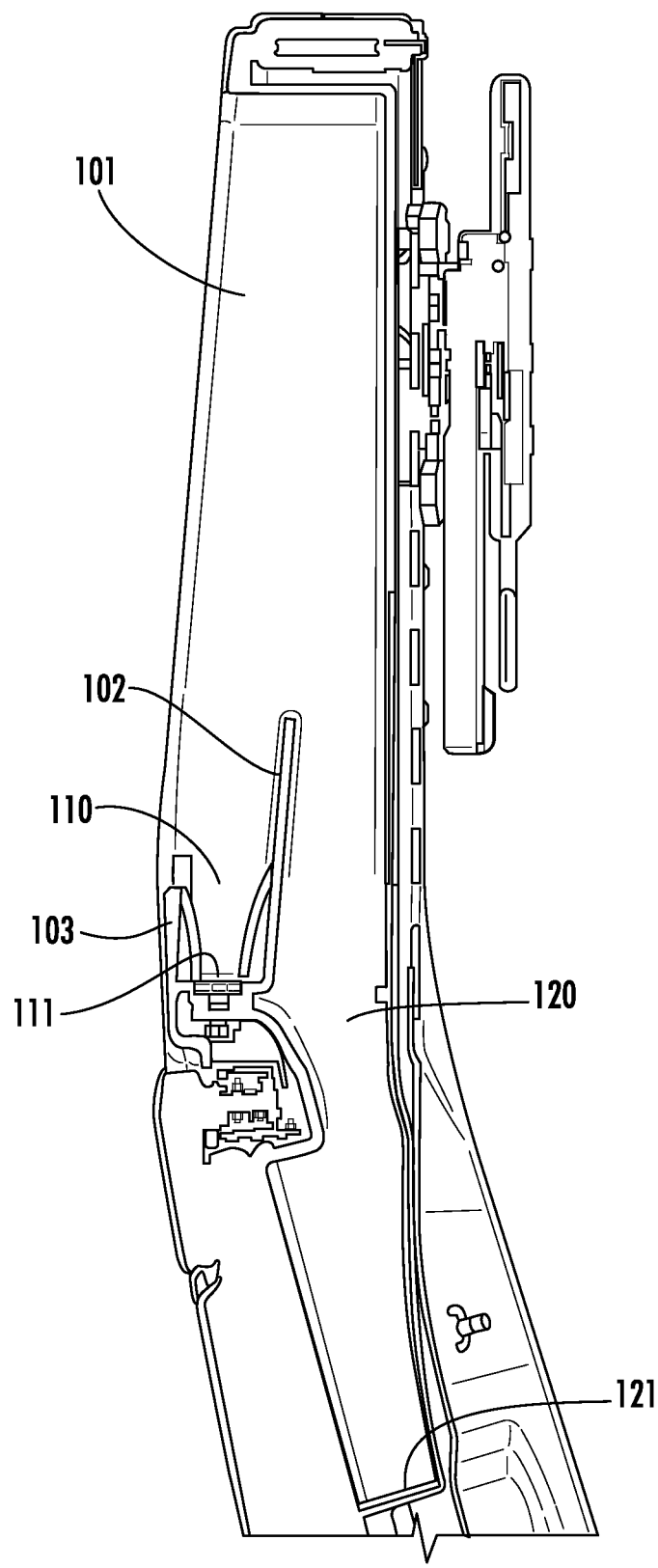
FIG. 4 is a cross-section view of the support assembly and passenger seat of FIG. 1.
Figure 5:
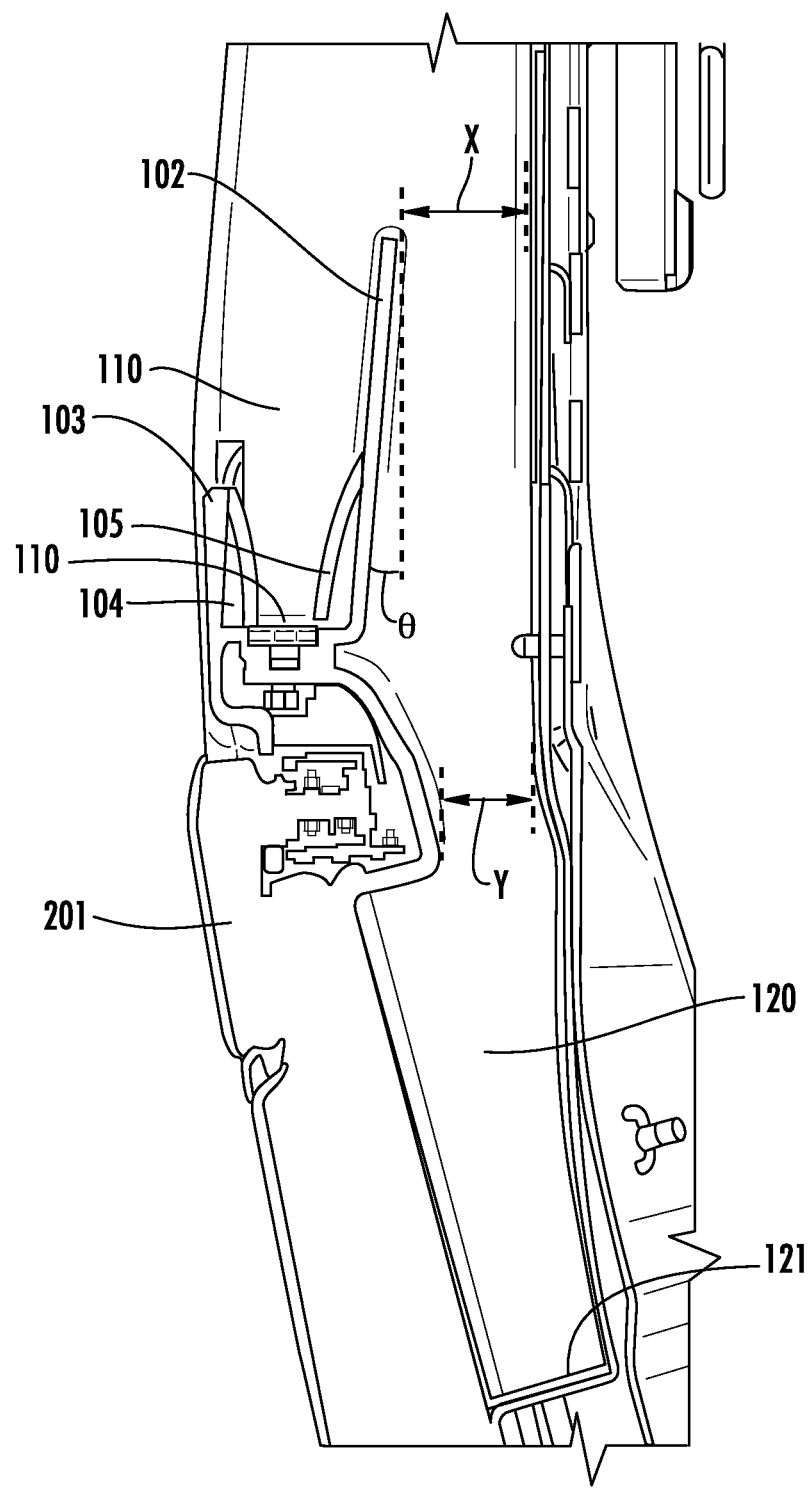
FIG. 5 is a cross-section view of the support assembly and passenger seat of FIG. 1.

The system illustrated in FIGS. 1-5 includes two or more compartments within the cavity 101 including, for example, a PED compartment 110 and a secondary compartment 120. The secondary compartment 120 may be utilized to store PEDs 10, periodicals 3, or other objects. As shown in FIGS. 4 and 5, the divider wall 102 is disposed within the cavity 101 and separates a lower portion of the cavity 101 into the two compartments. An upwardly extending lip 103 forms the lower edge of the cavity 101. In some embodiments, the cavity 101 is rectangular; however, although not illustrated, the cavity 101 may be any appropriate shape such as a square, trapezoid, rhombus, parallelogram, triangle, circle, any polygon, or any other appropriate shape.

As best shown in FIGS. 3 and 5, the PED compartment 110 may be configured with retaining portions 104 and 105. FIG. 5 shows that the rear retaining portions 104 are attached to an inner surface of the upwardly extending lip 103 and forward retaining portions 105 are attached to a rear surface of the divider wall 102. The retaining portions 104 and 105 may be configured to hold a PED 10 in an approximately vertical position optimized for viewing by a nearby passenger (e.g., a passenger seated rearward of the system). The retaining portions 104 and 105 may be configured to adapt to multiple thicknesses for a range of different PEDs 10 (including PEDs 10 that may be held in OEM or aftermarket cases). The retaining portions 104 and 105 may be configured to pinch the edge of the PED 10, may be configured to lean the PED 10 against the rear surface of the divider wall 102, or any other appropriate arrangement for a PED 10. The retaining portions 104 and 105 may be configured to deflect or deform without damaging the PED 10. As shown in FIG. 5, in some embodiments, forward retaining portions 105 may be slightly taller (i.e., longer is the vertical direction) than the rear retaining portions 104 to allow a passenger to insert a PED 10 and bias the PED 10 rearward away from the divider wall 102. In some embodiments, the divider wall 102 may be angled forward (i.e., away from the viewing passenger) by an angle θ (with respect to vertical). In some embodiments, the angle θ is between approximately 1° and 10°. In some embodiments, the angle θ is approximately 5°.

The secondary compartment 120 is located on a forward side of the divider wall 102 and, in some embodiments, includes a greater overall height to store objects without maintaining a visible position of the object (i.e., at least a portion of the object would typically not be visible while stored in the secondary compartment 120). The bottom or lower extremity 121 of the secondary compartment 120 may align with a portion of the tray table 201 and may be below a bottom or lower extremity 111 of the PED compartment 110. In some embodiments, the upper edge of the divider wall 102 defines a minimum opening dimension X (due to the angle θ described above). In certain embodiments, the latch mechanism 203 defines an overall minimum dimension Y of the secondary compartment 120. In some embodiments, the minimum opening dimension X is between approximately 0.25" and 1.25". In some embodiments, the minimum opening dimension X is approximately 0.8". In some embodiments, the overall minimum dimension Y is between approximately 0.25" and 1". In some embodiments, the overall minimum dimension Y is approximately 0.6". An object may be inserted into the secondary compartment 120 such that the object passes through the gap defined by the overall minimum dimension Y such that the bottom of the object rests against a lower internal surface 121 of the secondary compartment 120. As shown in FIG. 3, the lower access hole 202 may be disposed adjacent to the lower extremity or lower internal surface 121 of the secondary compartment 120 and may extend across the entire width of the secondary compartment 120. The lower access hole 202 allows visual confirmation that the object has reached the bottom surface 121 of the secondary compartment 120. The lower access hole 202 also facilitates removal of small objects that may fall into the secondary compartment 120 and cleaning of the secondary compartment 120. In some embodiments, if an object has a dimension larger than overall minimum dimension Y but less than minimum opening dimension X, the object may be inserted partially into the secondary compartment 120 such that the bottom of the object rests on the protruding area that defines the overall minimum dimension Y (see FIG. 5).

Figure 6A:
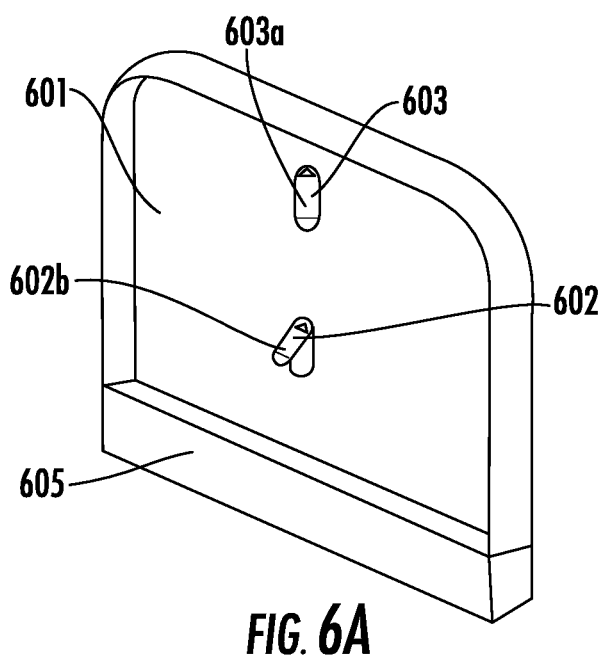
FIG. 6A is a perspective view of a support assembly mounted to a passenger seat, according to certain embodiments of the present invention.
Figure 6B:
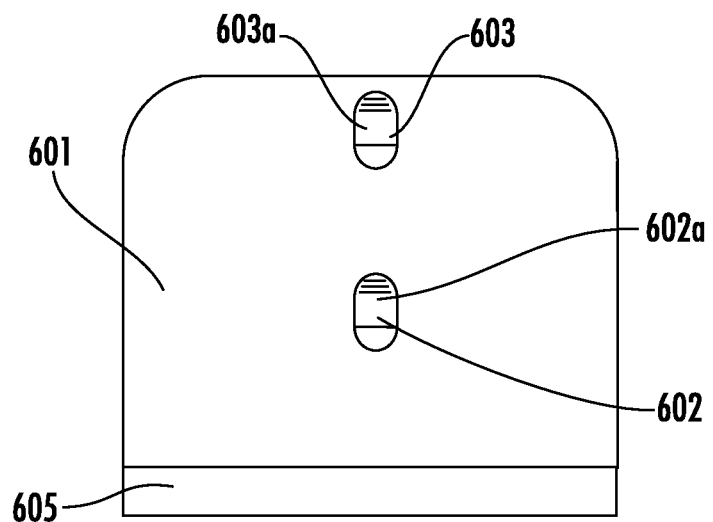
FIG. 6B is a rear view of the support assembly and passenger seat of FIG. 6A.
Figure 6C:
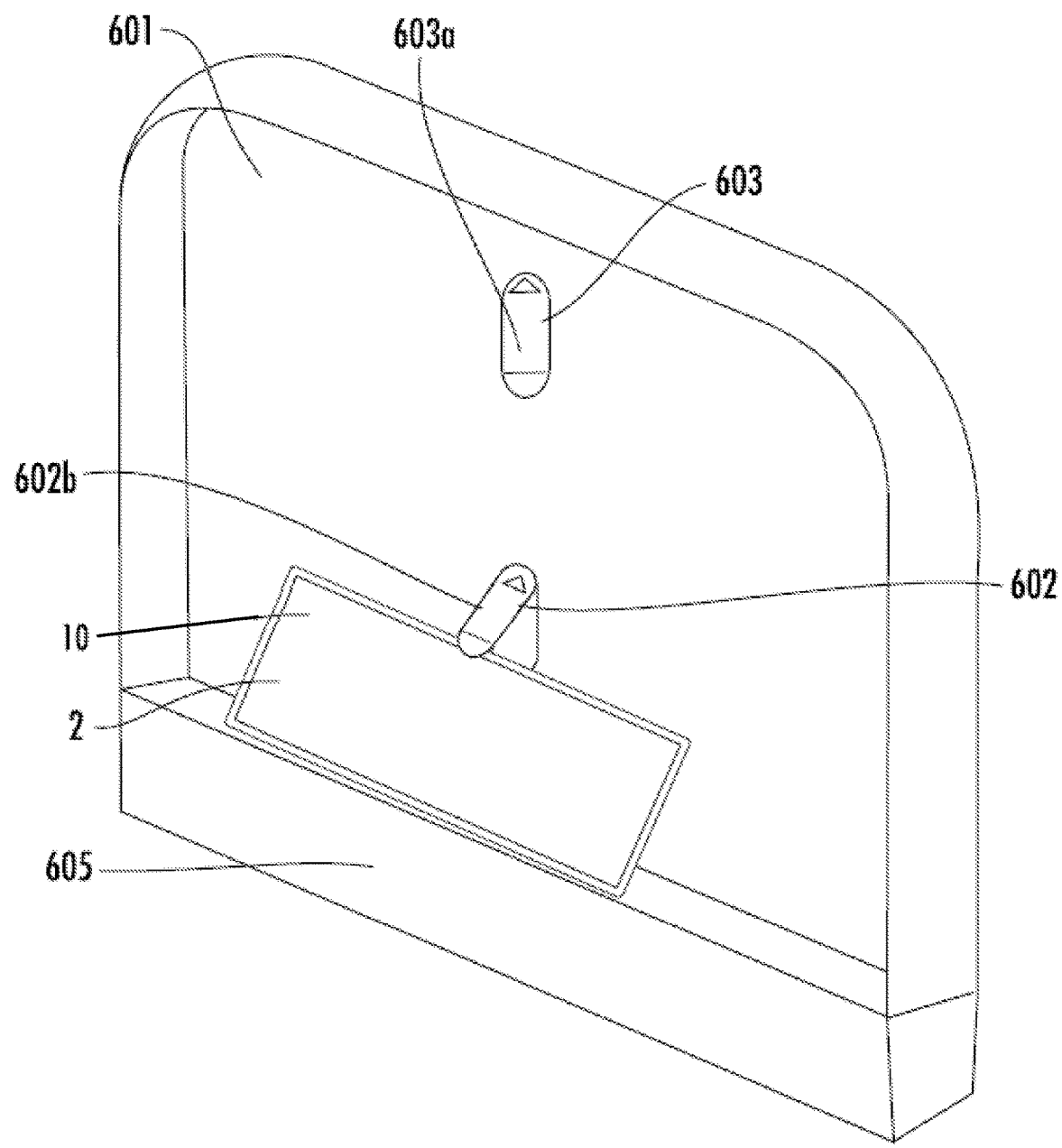
FIG. 6C is a perspective view of the support assembly and passenger seat of FIG. 6A.
Figure 7:
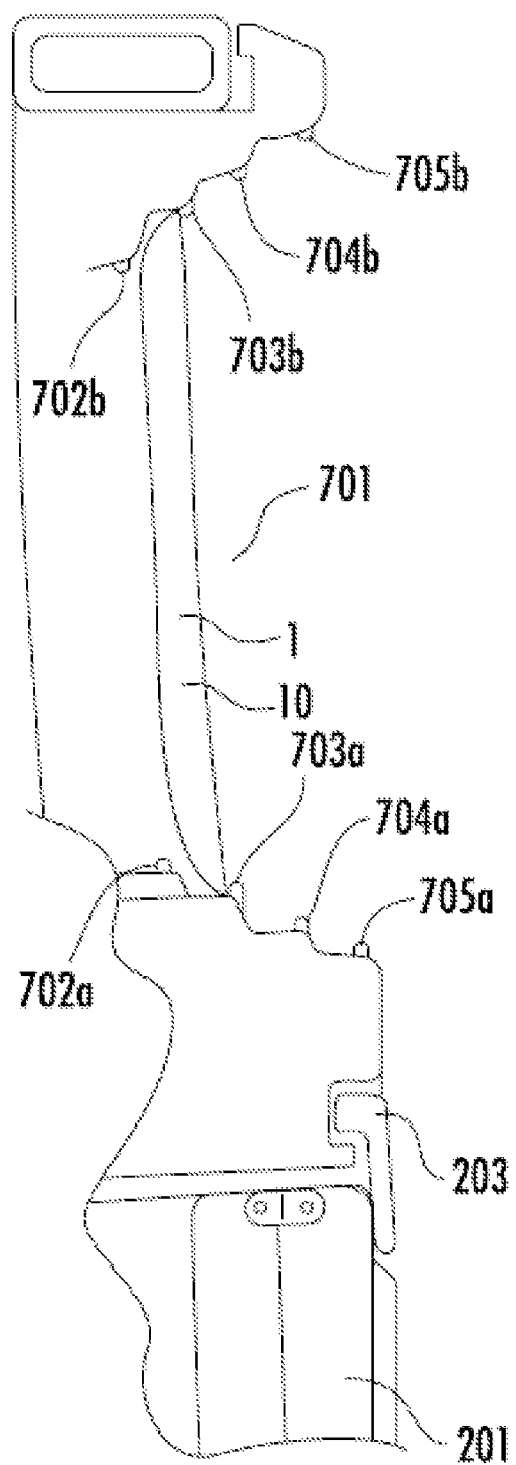
FIG. 7 is a cross-section view of a support assembly mounted to a passenger seat, according to certain embodiments of the present invention.

As shown in FIGS. 6A-7, some embodiments do not include a secondary compartment. The embodiments illustrated in FIGS. 6A-6C include a cavity 601, a ledge 605, and one or more moveable retention tabs (602, 603) where the retention tabs may move between stowed and deployed positions. For example, FIG. 6B shows a stowed position 602a for retention tab 602 and FIG. 6C shows a deployed position 602b for retention tab 602 holding an upper edge of a mobile phone 2. The illustrated positions include approximately flat (i.e., flush with the inner surface of the cavity 601) stowed positions (i.e., 602a and 603a) and deployed positions where a lower end of the retention tabs 602 and 603 pivot away from the surface of the inner surface of the cavity 601. FIGS. 6A-6C show a system with two retention tabs that pivot about a horizontal axis; however, the system may include any number of retention tabs and the retention tabs may pivot about a different axis or may move in a different manner (e.g., slide in a rectilinear direction). The first retention tab 602 may be located to correspond to an upper edge of a mobile phone (when the phone is placed in a landscape orientation on the ledge 605) and the second retention tab 603 may be located to correspond to an upper edge of a tablet (when the tablet is placed in a landscape orientation on the ledge 605). In some embodiments, the second retention tab 603 may be configured to slide along a vertical direction within the cavity 601 such that the second retention tab 603 may adapt to various sizes of tablets.

The pivoting mechanism of the retention tabs 602 and 603 may include springs to ensure the retention tabs 602 and 603 contact a PED 10 located adjacent the respective retention tab. Furthermore, the retention tabs 602 and 603 include a built-in adjustability or adaptability for a range of sizes of PEDs 10. For example, when the retention tab is pivoted to a deployed position, the upper edge of the PED 10 may be disposed under any portion of the retention tab (where a lower edge of the PED 10 is disposed on the ledge 605) such that the range of PEDs 10 includes small PEDs 10 that extend from the ledge 605 to a lower end of the retention tab and larger PEDs that extend from the ledge 605 to a higher end of the retention tab. FIG. 6C shows an example of a relatively small PED 10 (mobile phone 2) that extends up to a lower end of the first retention tab 602 when sitting on ledge 605.

In addition, system may include design features based on safety criteria. For example, the ledge 605 may be configured to break away during a high dynamic loading event (e.g., if a passenger impacts the ledge 605).

As shown in FIG. 7, in some embodiments, the system for storing personal devices and/or PEDs 10 may include a cavity 701 and one or more pairs of retaining members (702, 703, 704, 705). The cavity 701 may include stepped walls with multiple sizes for mating with the upper and lower edges of a PED 10 where each step includes a retaining member. For example, FIG. 7 shows four different stepped areas where the smallest stepped landing includes a lower retaining member 702a and an upper retaining member 702b and the largest stepped landing includes a lower retaining member 705a and an upper retaining member 705b. In some embodiments, as illustrated in FIG. 7, the system may include a first intermediate stepped landing that includes a lower retaining member 703a and an upper retaining member 703b and a second intermediate stepped landing includes a lower retaining member 704a and an upper retaining member 704b. As one example, FIG. 7 shows a tablet 1 secured in the first intermediate stepped landing held in place by the lower retaining member 703a and the upper retaining member 703b. In some embodiments, the smallest stepped landing and the first intermediate stepped landing are sized for holding miniature-sized tablets while the largest stepped landing and the second intermediate stepped landing are sized for holding larger or full-sized tablets. In certain embodiments, the multiple landings are sized to hold various PEDs 10 in both portrait and landscape configurations.

In some embodiments, the retaining members (702a-705a and 702b-705b) are configured to deflect or deform without damaging the PED 10. The stepped landings (onto which the retaining members are attached) may be rigid or, in some embodiments, may be configured to bend slightly toward or away from one another in a clamshell fashion. The clamshell bending allows a greater range for each pair of retaining members (e.g., a slightly larger tablet the dimension between the stepped surfaces will fit when the stepped landing bend away from one another).

Figure 8:
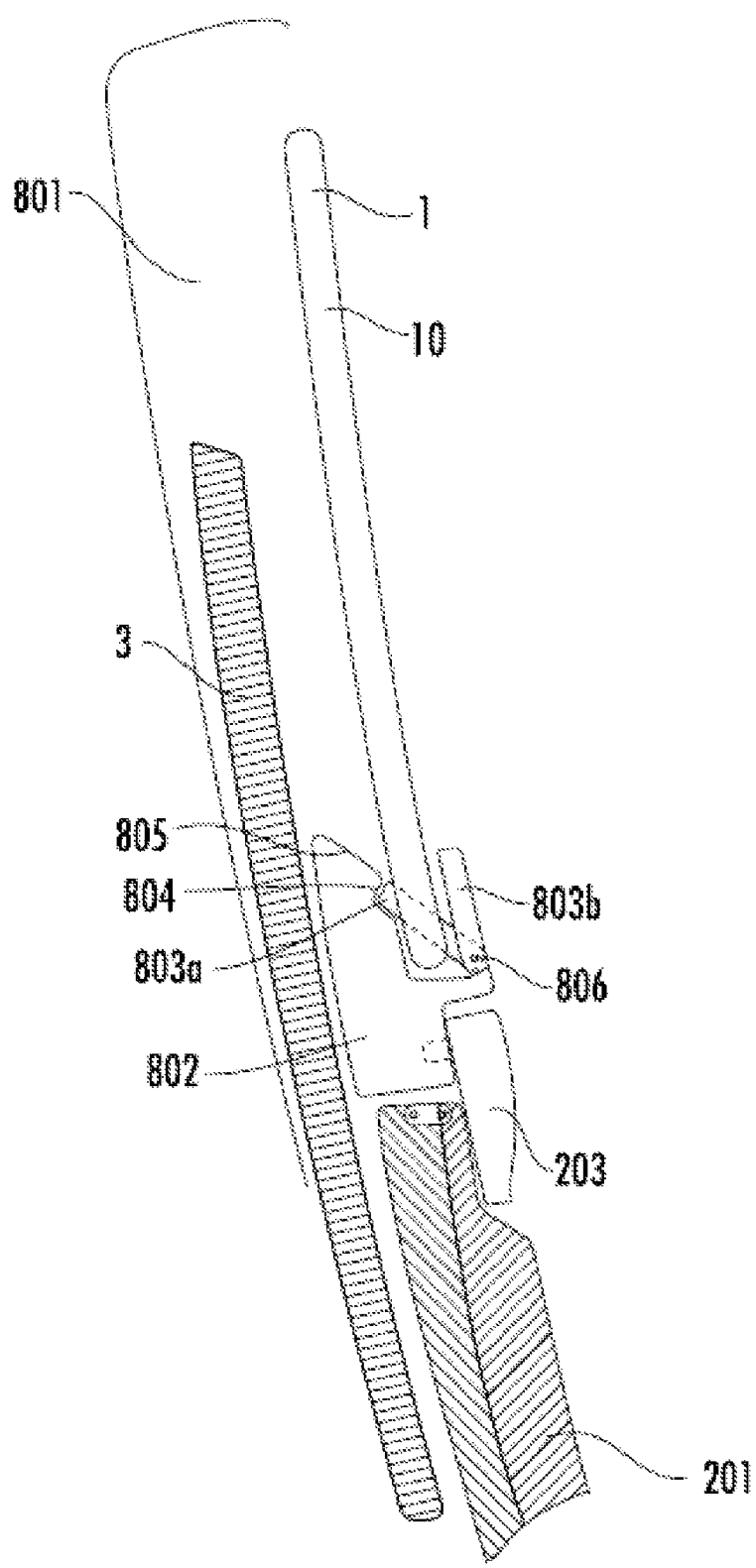
FIG. 8 is a cross-section view of a support assembly mounted to a passenger seat, according to certain embodiments of the present invention.

As shown in FIG. 8, in some embodiments, the system includes a cavity 801, a divider wall 802, and a pivoting tab 803. The pivoting tab 803 may be attached to a rear side of the divider wall 802. On a forward side of the divider wall 802 is a secondary compartment that may be utilized to store PEDs 10, periodicals 3, or other objects. The pivoting tab 803 has a stowed position 803a (shown in dotted line in FIG. 8) and a deployed position 803b. In some embodiments, the pivoting tab 803 rotates between the stowed position 803a and the deployed position 803b about a hinge 806 and includes a spring (which may be integral to the hinge 806) biasing the tab 803 toward the stowed position 803a such that an object is captured between the tab 803 and the divider wall 802. The exact location of the deployed position 803b depends on the thickness of the object being secured. As one example, FIG. 8 shows a tablet 1 secured between the tab 803 and the divider wall 802.

When the tab 803 is in the stowed position 803a, the tab 803 interfaces with a notch 804 of the divider wall 802. In some embodiments, the divider wall 802 includes an angled upper surface 805 such that the pivoting tab 803 and the upper surface 805 fit flush with one another and form a continuous surface in the stowed position 803a.

The components of the systems described herein may be formed of materials including, but not limited to, rubber, synthetic rubber, carbon composite, plastic, thermoplastic, steel, aluminum, stainless steel, other plastic or polymer materials, other metallic materials, other composite materials, or other similar materials. Moreover, the components of the systems may be attached to one another via suitable fasteners, which include, but are not limited to, screws, bolts, rivets, welds, co-molding, injection molding, or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A system for storing objects on a rear side of a passenger seat, the system comprising:
   a cavity;
   a divider wall disposed within the cavity; and
   an upwardly extending lip forming a lower boundary of the cavity, wherein:
   the divider wall separates a lower portion of the cavity into at least two compartments including a personal electronic device compartment on a rear side of the cavity and a secondary compartment on a forward side of the cavity; and
   the personal electronic device compartment comprises:
   at least one first retaining portion disposed on a forward side of the upwardly extending lip; and
   at least one second retaining portion disposed on a rear side of the divider wall.

2. The system of claim 1, wherein the secondary compartment includes a lower extremity that extends below a lower extremity of the personal electronic device compartment.

3. The system of claim 1, wherein the first and second retaining portions are configured to deflect when an object is inserted between the at least one first retaining portion and the at least one second retaining portion.

4. The system of claim 1, wherein the at least one second retaining portion is longer in a vertical direction than the at least one first retaining portion.

5. The system of claim 1, further comprising an access hole on a rear side of the system such that the access hole allows access to the secondary compartment.

6. The system of claim 5, wherein the access hole is disposed adjacent to a lower internal surface of the secondary compartment and extends across an entire width of the secondary compartment.

7. A passenger seat comprising:
   a system for storing objects disposed on a rear side of the passenger seat, the system comprising:
   a cavity; and
   a divider wall disposed within the cavity;
   a moveable tray table disposed on the rear side of the passenger seat and below the system for storing objects, wherein:
   the divider wall separates a lower portion of the cavity into at least two compartments including a personal electronic device compartment on a rear side of the cavity and a secondary compartment on a forward side of the cavity; and
   the moveable tray table is configured to move between a stowed position and a deployed position.

8. The passenger seat of claim 7, further comprising an access hole that allows access to the secondary compartment.

9. The passenger seat of claim 8, wherein the access hole is covered by the moveable tray table when in the stowed position and is accessible when the moveable tray table is in the deployed position.

10. The passenger seat of claim 8, wherein the access hole is disposed adjacent to a lower internal surface of the secondary compartment and extends across an entire width of the secondary compartment.

11. The passenger seat of claim 7, further comprising an electronic connection disposed on the rear side of the passenger seat and adjacent to the system for storing objects.

12. The passenger seat of claim 11, wherein the electronic connection is disposed on a first side of the system for storing objects and closer to a lower edge of the system for storing objects.

13. The passenger seat of claim 7, wherein the secondary compartment includes a lower extremity that extends below a lower extremity of the personal electronic device compartment.

14. The passenger seat of claim 7, further comprising an upwardly extending lip forming a lower boundary of the cavity, wherein the personal electronic device compartment comprises:
   at least one first retaining portion disposed on a forward side of the upwardly extending lip; and
   at least one second retaining portion disposed on a rear side of the divider wall.

15. The passenger seat of claim 14, wherein the first and second retaining portions are configured to deflect when an object is inserted between the at least one first retaining portion and the at least one second retaining portion.

16. The passenger seat of claim 14, wherein the at least one second retaining portion is longer in a vertical direction than the at least one first retaining portion.

17. The passenger seat of claim 7, further comprising a pivoting tab attached to a rear side of the divider wall.

18. The passenger seat of claim 17, wherein:
   the pivoting tab is configured to move between a stowed position and a deployed position; and
   when the pivoting tab is in the stowed position, the pivoting tab fits in a notch formed in the divider wall and forms a continuous surface with the divider wall.

19. A passenger seat comprising:
   a system for storing objects disposed on a rear side of the passenger seat, the system comprising:
   a cavity; and
   a divider wall disposed within the cavity,
   an electronic connection disposed on the rear side of the passenger seat and adjacent to the system for storing objects,
   wherein the divider wall separates a lower portion of the cavity into at least two compartments including a personal electronic device compartment on a rear side of the cavity and a secondary compartment on a forward side of the cavity.

20. A passenger seat comprising:
   a system for storing objects disposed on a rear side of the passenger seat, the system comprising:
   a cavity;
   a divider wall disposed within the cavity; and
   a pivoting tab attached to a rear side of the divider wall, wherein:
   the divider wall separates a lower portion of the cavity into at least two compartments including a personal electronic device compartment on a rear side of the cavity and a secondary compartment on a forward side of the cavity;
   the pivoting tab is configured to move between a stowed position and a deployed position; and
   when the pivoting tab is in the stowed position, the pivoting tab fits in a notch formed in the divider wall and forms a continuous surface with the divider wall.

* * * * *